R. A. W. KRAMPITZ.
FUSE IGNITER.
APPLICATION FILED JUNE 30, 1913.
1,101,292.
Patented June 23, 1914.
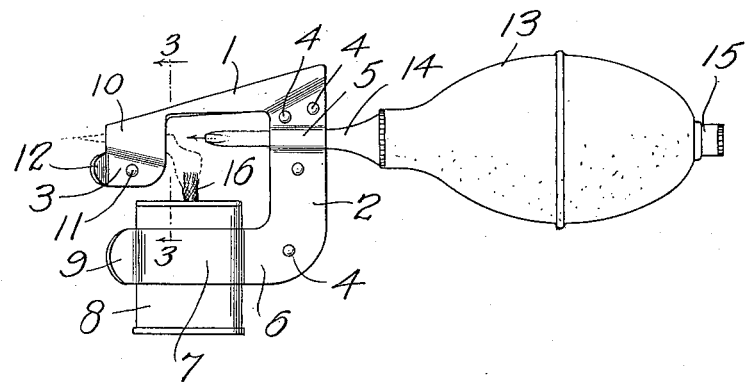
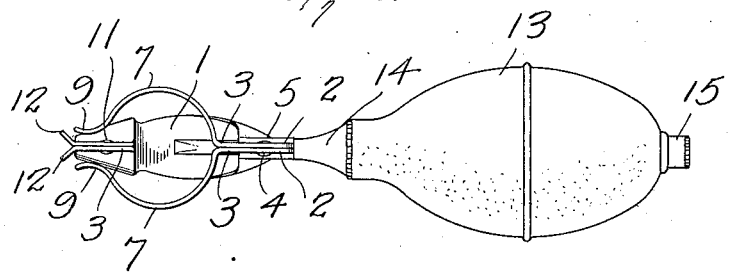
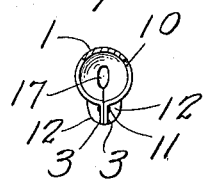
WITNESSES
INVENTOR
ROBERT A. W. KRAMPITZ,
BY
ATTORNEYS

UNITED STATES PATENT OFFICE.

ROBERT A. W. KRAMPITZ, OF SPOKANE, WASHINGTON.

FUSE-IGNITER.

1,101,292.   Specification of Letters Patent.   Patented June 23, 1914.

Application filed June 30, 1913. Serial No. 776,602.

*To all whom it may concern:*

Be it known that I, ROBERT A. W. KRAMPITZ, a citizen of the United States, and a resident of Spokane, in the county of Spokane and State of Washington, have made certain new and useful Improvements in Fuse-Igniters, of which the following is a specification.

My invention is an improvement in fuse igniters, and has for its object to provide an igniter of the character specified, for lighting the fuses used in blasting, and so arranged that a tongue of flame may be directed away from the operator, for engaging the fuse to ignite the same at the end thereof, to prevent burning the fuse or igniting the same except at the end remote from the blast.

In the drawings: Figure 1 is a side view of the improved igniter, Fig. 2 is a bottom plan view with the candle or torch removed, and, Fig. 3 is a section on the line 3—3 of Fig. 1, looking in the direction of the arrows.

The present embodiment of the invention comprises a bracket formed from a sheet of metal, consisting of a body 1 having at each end laterally extending arms 2 and 3. The arms 2 are lapped upon each other or superimposed, and are secured together by means of rivets 4 or the like, the rivets being passed through the superimposed arms and headed on opposite sides thereof. Intermediate the ends of the arms and near the body 1 the said arms are bent away from each other to form a transverse cylindrical bearing 5, for a purpose to be presently described.

Each of the arms 2 is provided at the end remote from the body with a lateral extension 6, the said extension being integral with the arm, and extending approximately parallel with the body 1 of the bracket. Each of the said extensions 3 is bent outward in curved form, as shown at 7, to provide one section of a clamp or split bearing, for receiving a torch 8 or the like, and the free ends of the extensions are bent or curved reversely, as shown at 19, to permit the torch to be slipped into the split bearing.

The body 1 of the bracket is arched transversely to form a hood or shield above the torch, and above the bearing 5, and the said body is of greatest width at its center and gradually decreases toward the arms 2 and 3, as shown more particularly in Fig. 2.

The arms 3 of the bracket are bent or curved outwardly away from each other adjacent to the body to form a frusto-conical or funnel shaped director 10. Beyond the director, the arms are bent to lap upon each other, and are secured together by rivets 11 or the like. Each of the said arms is provided at the opposite end from the arms 2 with a lateral lug 12, the said lugs diverging from each other, as shown more particularly in Fig. 2. The director 10 has its large end toward the bearing 5, and the said director is co-axial with the said bearing. A pump or bellows is used in connection with the bracket, the said pump or bellows comprising a rubber bulb, having a delivery tube or blast pipe 14 connected with one end thereof. The opposite end of the bulb is provided with an inlet valve 15, and the blast pipe 14 is of such length that when it is passed through the bearing 5, the free end thereof will extend to near the wick 16 of the torch.

In operation, the torch 8 or a candle if desired, is engaged with the split bearing 7, as shown in Fig. 1. The small end of the director 10 is approached to the fuse to be lighted, and it will be noted from an inspection of Fig. 3 that the opening 17 at the small end of the director is elliptical in shape, with its long axis vertical. The lugs 12 form a guard for engaging the end of the fuse and also form a guide for indicating the correct placing of the igniter. When the device is in proper position, a blast of air is forced from the pipe 14, by compressing the bulb 13, and the flame of the torch is driven through the director, as indicated in Fig. 1, and is directed against the end of the fuse, to ignite the same. Any preferred form of igniting means, as for instance a candle or torch may be used in connection with the bracket.

The device is intended for use in mines and tunnels for igniting fuses. As is known in such structures, there is a considerable moisture on this account, and the hood 1 is arranged above the flame, to deflect any drippings from the flame. The flame is uninclosed at the sides however, to prevent overheating, that is, to permit a free circulation of air to cool the bracket.

I claim:—

1. A device of the character specified, comprising a bracket having a transversely arched body provided at each end with laterally extending arms, the arms at one end being bent outwardly away from each other to form a frusto-conical or funnel shaped director having its large end toward the other pair of arms, said other pair of arms being bent outwardly away from each other to form a bearing for a blast pipe co-axial with the director, and being secured together on both sides of the said bearing, each of the last-named pair of arms having a lateral extension extending approximately parallel with the body of the bracket, said extensions being curved outwardly away from each other to form a split clamp or bearing for engaging a torch, the first-named arms being secured together beyond the director, and each of the said arms having a lug extending approximately parallel with the axis of the director, said lugs diverging from each other, and an air compressor having a blast pipe for engaging the bearings.

2. A device of the character specified, comprising a bracket having a transversely arched body provided at each end with laterally extending arms, the arms at one end being bent outwardly away from each other to form a frusto-conical or funnel shaped director having its large end toward the other pair of arms, said other pair of arms being bent outwardly away from each other to form a bearing for a blast pipe co-axial with the director, said last-named arms having lateral extensions approximately parallel with the bracket body and curved outwardly away from each other to form a split bearing for engaging a torch, said first-named arms having diverging lugs below the small end of the director.

3. A device of the character specified, comprising a transversely arched hood arranged with its convex surface upwardly, said hood having at one end a frusto-conical director arranged with its large end inwardly, said director having at its small end a guide for engaging the fuse, said hood having at the opposite end from the director a depending arm provided with a bearing for a blast pipe, said arm having a lateral forwardly extending split bearing for engaging a torch.

4. A device of the character specified, comprising a bracket having a bearing for receiving a blast pipe and having a tubular director coaxial with the bearing and having its large end toward the bearing, said bracket having a transversely arched hood between the bearing and the director and having means for supporting a torch below the hood and between the director and the blast pipe bearing.

5. A device of the character specified, comprising a bracket having a bearing for the blast pipe and a bearing for a torch below the bearing for the blast pipe and in front of the same to support the torch in position to bring the flame thereof in front of the blast pipe, said bracket having a tubular director in front of the blast pipe and a transversely arched hood between the director and the bearing for the blast pipe and above the flame.

ROBERT A. W. KRAMPITZ.

Witnesses:
  Frank J. Guse,
  Ida E. Zinter.

---

Copies of this patent may be obtained for five cents each, by addressing the "Commissioner of Patents, Washington, D. C."